United States Patent
Kondaveeti et al.

(10) Patent No.: US 9,858,106 B2
(45) Date of Patent: *Jan. 2, 2018

(54) VIRTUAL MACHINE CAPACITY PLANNING

(71) Applicant: EMC Corporation, Hopkinton, MA (US)

(72) Inventors: Anirudh Kondaveeti, Foster City, CA (US); Derek Lin, San Mateo, CA (US)

(73) Assignee: EMC IP Holding Co. LLC, Hopkinton, MA (US)

(*) Notice: Subject to any disclaimer, the term of this patent is extended or adjusted under 35 U.S.C. 154(b) by 94 days.

This patent is subject to a terminal disclaimer.

(21) Appl. No.: 14/968,745

(22) Filed: Dec. 14, 2015

(65) Prior Publication Data

US 2016/0098291 A1    Apr. 7, 2016

Related U.S. Application Data (63) Continuation of application No. 14/041,332, filed on Sep. 30, 2013, now Pat. No. 9,244,711.

(51) Int. Cl.
| | |
|---|---|
| *G06F 9/46* | (2006.01) |
| *G06F 9/455* | (2006.01) |
| *G06F 11/30* | (2006.01) |
| *G06F 11/00* | (2006.01) |
| *G06F 9/50* | (2006.01) |
| *G06F 11/34* | (2006.01) |
| *G06F 11/07* | (2006.01) |

(52) U.S. Cl.
CPC ...... *G06F 9/45558* (2013.01); *G06F 9/45533* (2013.01); *G06F 9/50* (2013.01); *G06F 11/008* (2013.01); *G06F 11/0712* (2013.01); *G06F 11/0754* (2013.01); *G06F 11/3003* (2013.01); *G06F 11/3442* (2013.01); *G06F 11/3452* (2013.01); *G06F 11/0709* (2013.01); *G06F 11/3447* (2013.01); *G06F 11/3466* (2013.01); *G06F 2009/45591* (2013.01); *G06F 2201/815* (2013.01)

(58) Field of Classification Search
None
See application file for complete search history.

(56) References Cited

U.S. PATENT DOCUMENTS

| | | | |
|---|---|---|---|
| 2004/0088406 A1* | 5/2004 | Corley | H04L 43/16 709/224 |
| 2015/0007173 A1* | 1/2015 | Ionescu | G06F 9/45533 718/1 |

OTHER PUBLICATIONS

Qu et al; Multivariate Statistical Analysis for Network Attacks Detection; IEEE 2005.*

* cited by examiner

*Primary Examiner* — Bing Zhao
(74) *Attorney, Agent, or Firm* — Barry N. Young (57) ABSTRACT

Virtual machine capacity planning techniques are disclosed. In various embodiments, a set of time series data is constructed based at least in part on virtual machine related metric values observed with respect to a virtual machine during a training period. The constructed time series data is used to build a forecast model for the virtual machine. The forecast model is used to forecast future values for one or more of the virtual machine related metrics. The forecasted future values are used to determine whether an alert condition is predicted to be met.

20 Claims, 6 Drawing Sheets

VIRTUAL MACHINE CAPACITY PLANNING

CROSS REFERENCE TO OTHER APPLICATIONS

This application is a continuation of U.S. patent application Ser. No. 14/041,332 entitled VIRTUAL MACHINE CAPACITY PLANNING filed Sep. 30, 2013, now U.S. Pat. No. 9,244,711, which is incorporated herein by reference for all purposes.

BACKGROUND OF THE INVENTION

Typically, virtual machine (VM) performance data is monitored by comparing metrics to predetermined static thresholds. Individual logged and/or otherwise reported values are compared, for example, to corresponding alert thresholds, and if a value of a metric exceeds the threshold an alert is generated.

In the typical approach, only historical values are monitored. As a result, alert thresholds may be set at a value such that an alert is triggered well before an actual failure would occur, to give administrators time to receive, evaluate, and respond to the alert.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Using statistical modeling techniques to predict virtual machine capacity needs is disclosed. In various embodiments, the respective values of various metrics indicative of virtual machine health, utilization, etc. are reported and used to build multivariate time series that describe the state of the virtual machine for corresponding time periods, for example hourly (t=1 to 24) over a number of days (d) in a "training" or other observation period. The multivariate time series are used to build a forecasting model for each of the respective time periods (e.g., t=1 based on metrics as observed for t=1 over days d=1, 2, 3, etc.) Virtual machine metrics observed in the training period are used to determine alert thresholds. Forecasted values are compared to the determined thresholds to determine whether an alert condition is predicted. Administrators may take responsive action when an alert condition is determined to have been predicted, such as examining the predicted metric values to determine a possible reason for the predicted alert condition and/or to determine whether preemptive action should be taken, for example to increase capacity in anticipation of the predicted event.

Figure 1:
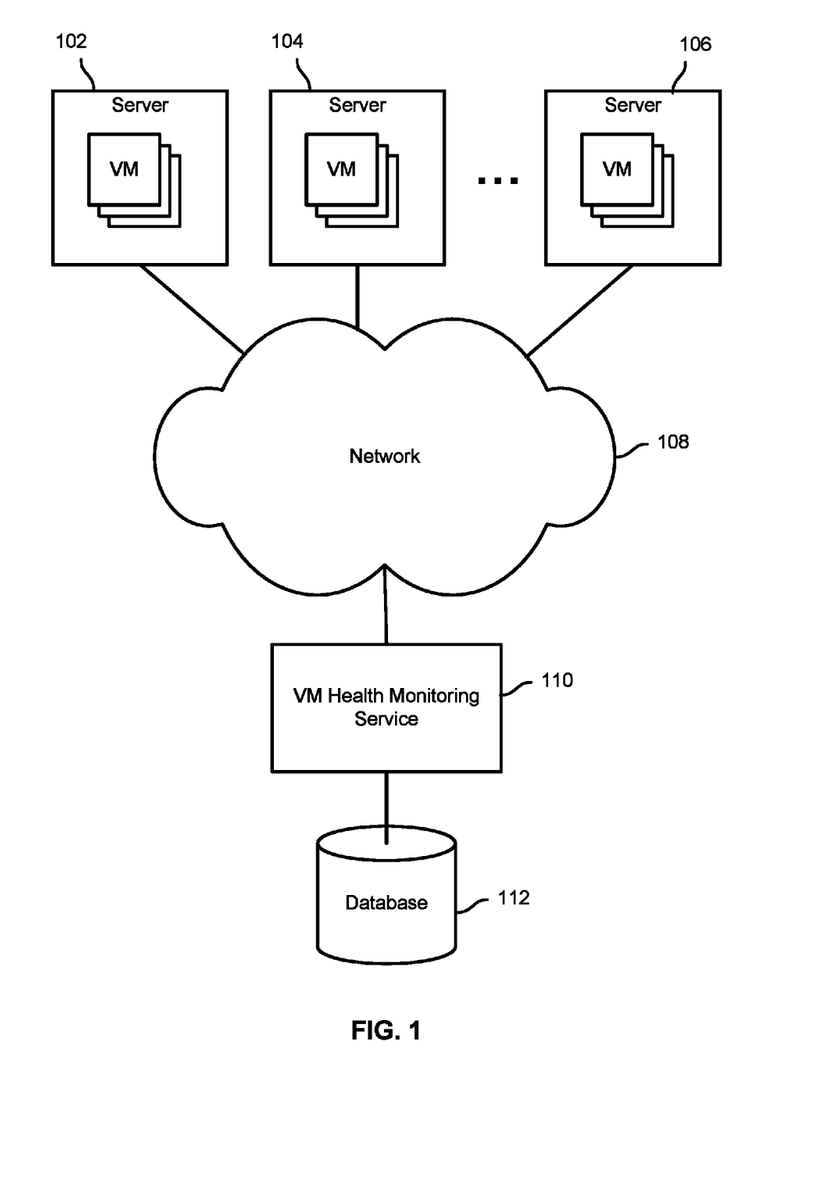
FIG. 1 is a block diagram illustrating an embodiment of a virtual machine capacity planning system.

FIG. 1 is a block diagram illustrating an embodiment of a virtual machine capacity planning system. In the example shown, a plurality of servers, represented in FIG. 1 by servers 102, 104, and 106, each has one or more virtual machine instances running on it. The virtual machines and/or a supervisory entity or node gathers statistics (metrics) associated with the virtual machine, such as health, usage, error, and configuration data. The metrics are reported via network 108 (e.g., the Internet) to a virtual machine health monitoring service 110, which stores the virtual machine metrics in a database 112. The virtual machine health monitoring service 110 uses the reported metrics to build a statistical model for each virtual machine for each of a plurality of corresponding periods, such as the same one hour period for each of a plurality of successive days. In various embodiments, the virtual machine health monitoring service 110 uses the observed virtual machine metric data to determine threshold values to detect alert conditions. The respective models are used to forecast values for the virtual machine metrics in future periods. If forecasted values predict that a determined threshold will be exceeded, an alert is generated and/or responsive action may be taken.

In various embodiments, one or more of CPU, memory, and/or disk related metrics may be used. In some embodiments, monitored virtual machine metrics include one or more of the following:

cpu_capacity_entitlement_average
cpu_corecount_contention_average
cpu_ready_summation
cpu_usage_average
cpu_usagemhz_average
cpu_idle_summation
cpu_system_summation
cpu_wait_summation
disk_read_average

```
disk_write_average
disk_maxtotallatency_latest
disk_usage_average
mem_active_average
mem_activewrite_average
mem_capacity_entitlement_average
mem_capacity_usage_average
mem_consumed_average
mem_entitlement_average
mem_latency_average
mem_overhead_average
mem_swapin_average
mem_swapinrate_average
mem_swapout_average
mem_swapoutrate_average
mem_usage_average
mem_vmmemctl_average
net_bytesrx_average
net_bytestx_average
net_packetsrx_summation
net_packetstx_summation
net_usage_average
sys_heartbeat_summation
sys_osuptime_latest
sys_uptime_latest
```

Figure 2:
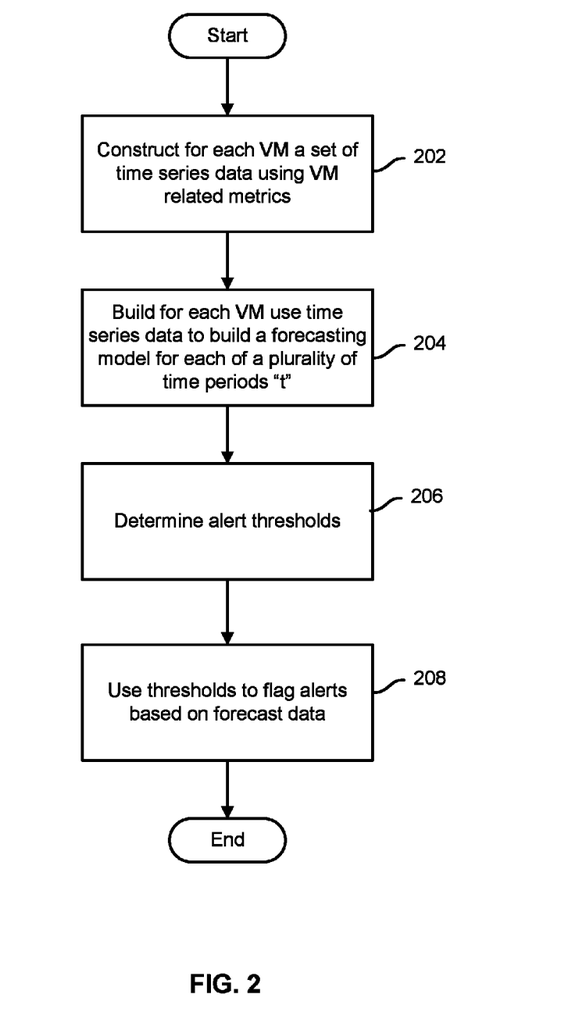
FIG. 2 is a flow chart illustrating an embodiment of a process to determine virtual machine capacity needs.

FIG. 2 is a flow chart illustrating an embodiment of a process to determine virtual machine capacity needs. In the example shown, received virtual machine metric values are used to construct for each virtual machine a set of time series data (202). In some embodiments, the time series data is constructed as follows: Consider the vector $V_{td}$, which stores the metrics corresponding to VM performance at time 't' on day 'd'. The time series constructed using this vector is $V_{td}$ for d=1, 2, 3 . . . . A forecasting model is built for each value of 't' (204). As an example, in some embodiments, if an hourly model is built by taking the values of the vector in each hour, a total of 24 models are built for t=1, 2, 3 . . . 24. In various embodiments, forecasting is done using a Vector Auto Regression (VAR) model, which is a natural extension of univariate autoregressive model to dynamic multivariate time series. Alert thresholds are determined (206), e.g., based on a Hotelling T2 or other summary statistic as calculated for the training data (208). The respective models are used to forecast metric values for the respective virtual machines, and the determined thresholds are used to detect alert conditions (208).

In various embodiments, a feature vector comprising fewer than all gathered VM metrics is used to build a statistical model of VM behavior and/or to detect alert conditions. The first step in the analysis is feature selection, i.e., to decide which features are most relevant for forecasting the time series. In some embodiments, Pearson correlation coefficients are calculated between the different variables, which reflect the degree of linear relationship between variables. A Pearson correlation coefficient ranges from –1 to +1. A correlation of +1 means that there is a perfect positive linear relationship between variables. Correlated features are redundant for forecasting as they do not provide any additional information for the forecast. In some embodiments, among the complete set of 34 features listed above that may be used to describe VM performance, correlation between the features is exploited to reduce the feature space to 13 metrics. In some embodiments, time series based on a reduced set of features (e.g., 13 vs. 34) are used to build a statistical model and detect alert conditions as described herein.

Figure 3:
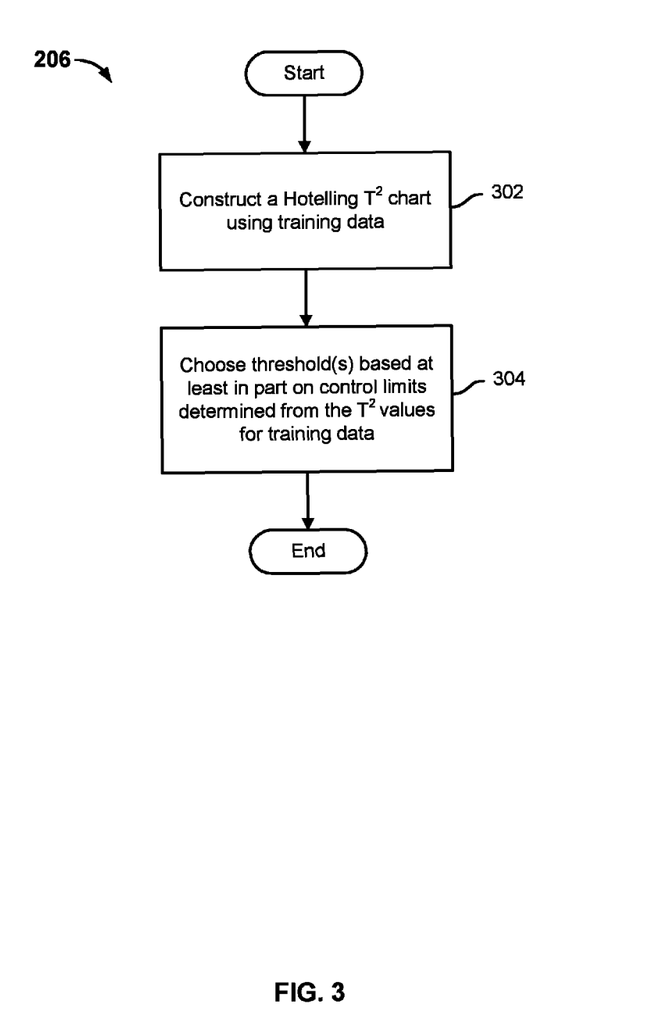
FIG. 3 is a flow chart illustrating an embodiment of a process to determine an alert threshold for a virtual machine capacity planning system.

FIG. 3 is a flow chart illustrating an embodiment of a process to determine an alert threshold for a virtual machine capacity planning system. In the example shown, a Hotelling T2 chart is constructed using VM performance metric data observed during a training period (302). In various embodiments, the Hotelling T2 statistic for observed period in a series comprises (e.g., hour t=1 for each of days d=1, 2, 3, etc.) summarizes in a single distance value a difference between an observed feature vector and an associated mean vector, e.g., determined across corresponding observed feature vectors in the training set. The Hotelling T2 distance is a measure that accounts for the covariance structure of a multivariate normal distribution. In general, the higher the T2 value, the more distant is the observation from the mean. Referring further to FIG. 3, for each VM the Hotelling T2 values determined for the training set are used to determine a corresponding alert threshold, such as an "upper control limit" or other control limit determined based on the computed Hotelling T2 values (304).

Figure 4:
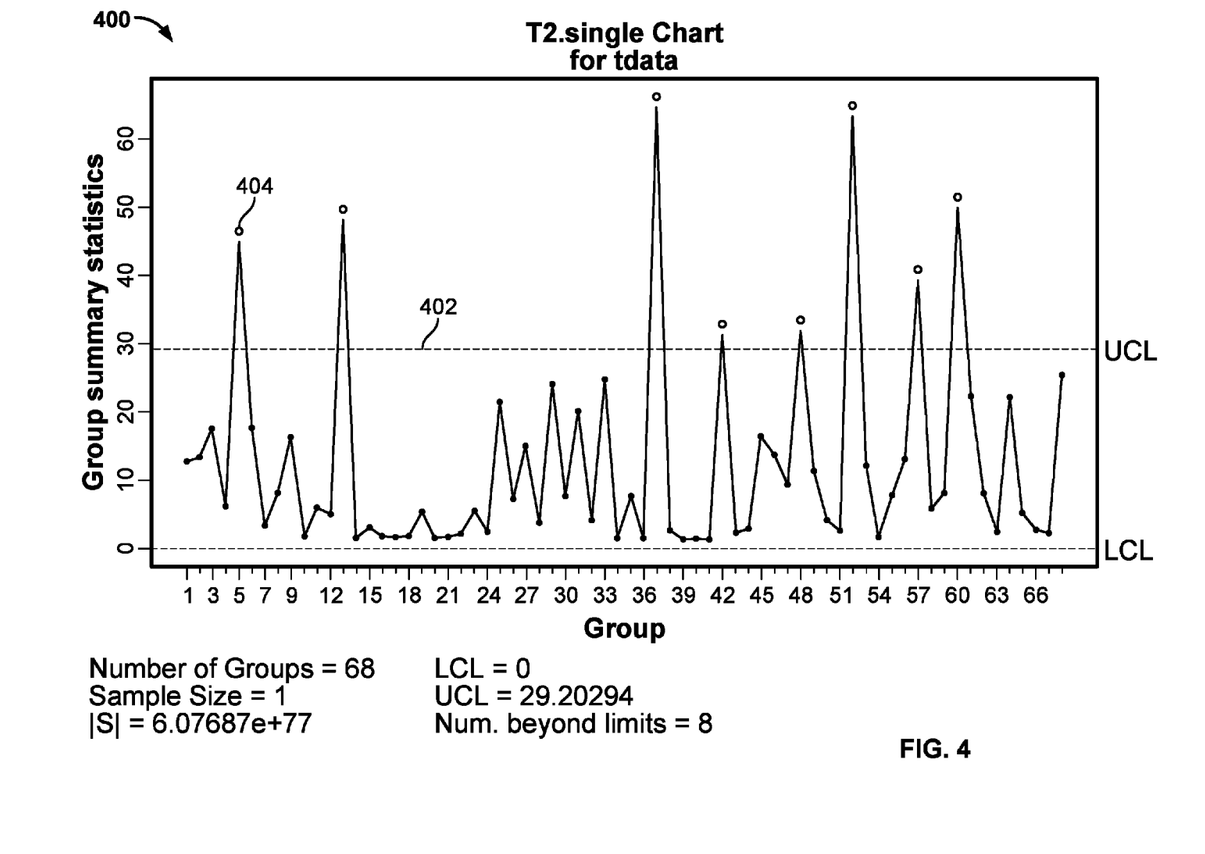
FIG. 4 is an example of a T2 chart illustrating an embodiment of a process to determine an alert threshold for a virtual machine capacity planning system.

FIG. 4 is an example of a T2 chart illustrating an embodiment of a process to determine an alert threshold for a virtual machine capacity planning system. In the example shown, the chart 400 comprises a chart of Hotelling T2 values for training period comprising 68 successive days. An upper control limit (UCL) computed based on the observed data is represented by a broken horizontal line 402. In the example shown, on the fifth day of the training period the computed Hotelling T2 statistic plotted at point 404 can be observed to have exceeded the UCL, as occurred as well on seven other days as shown in the chart 400. In various embodiments, an alert threshold equal to and/or otherwise based at least in part on the UCL represented by line 402 in FIG. 4 may be set and used to predict based on forecast data when alert conditions might be expected to occur in the forecast (future) period.

Figure 5:
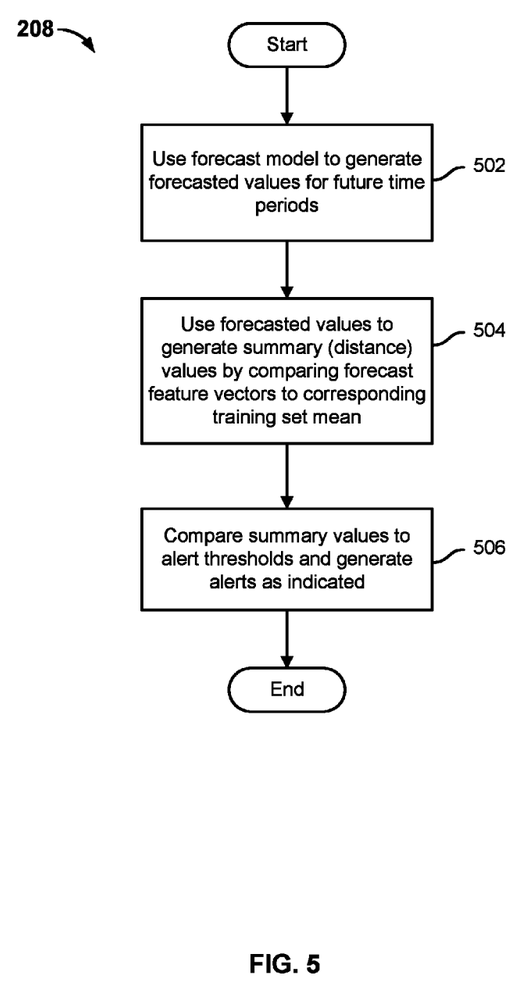
FIG. 5 is a flow chart illustrating an embodiment of a process to determine virtual machine capacity needs.

FIG. 5 is a flow chart illustrating an embodiment of a process to determine virtual machine capacity needs. In the example shown, a forecast model is used to generate forecast values for VM metrics in future time periods (502). In various embodiments, use of a vector autoregression or other statistical model that captures the linear interdependencies among multiple time series enables future values of the respective VM metrics to be predicted more accurately. In the example shown, the forecasted values are used to generate corresponding summary statistics, e.g., the Hotelling T2 distance between a forecasted feature vector and a corresponding mean vector determined from the training set (504). The summary statistics computed based on the forecasted values are compared to corresponding alert thresholds and alerts are generated as/if predicted summary statistics are determined to exceed corresponding alert thresholds (506).

Figure 6:
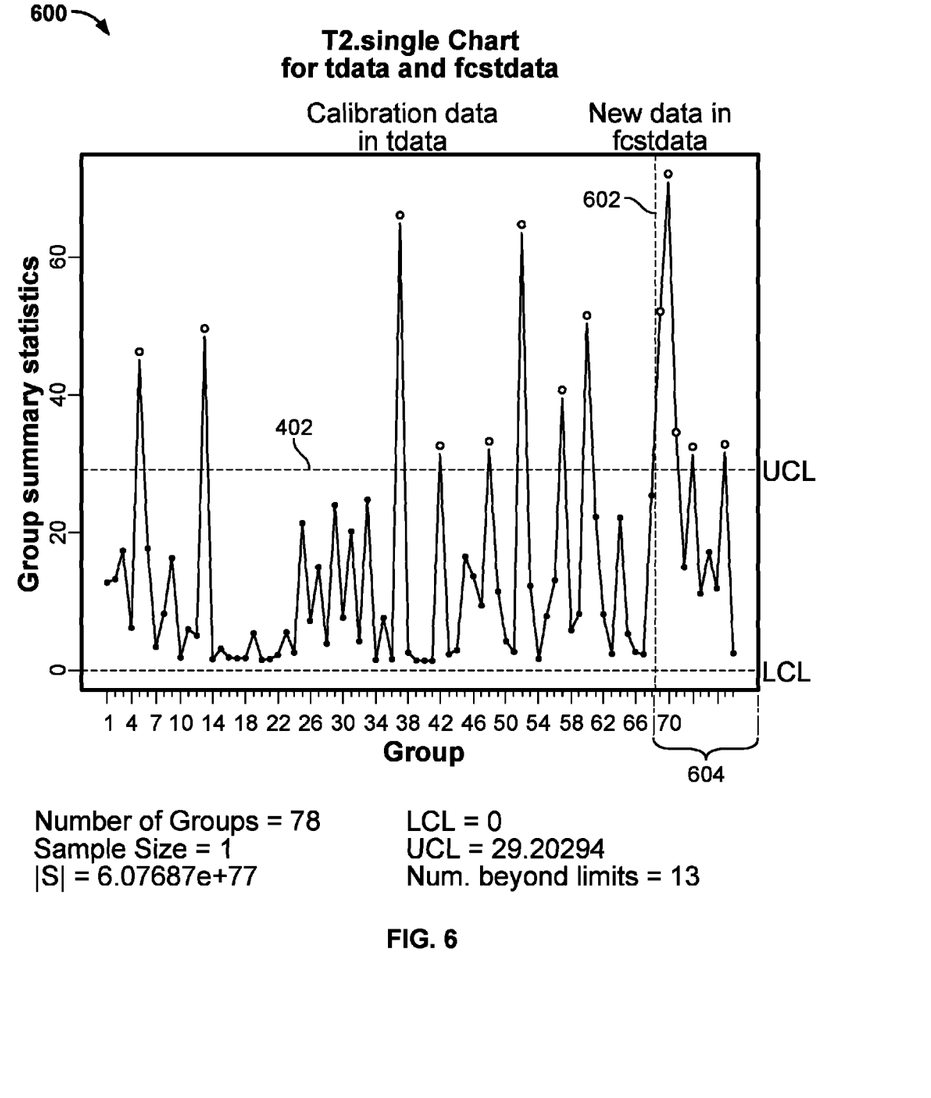
FIG. 6 is an example of a T2 chart illustrating an embodiment of a process to detect virtual machine capacity related events.

FIG. 6 is an example of a T2 chart illustrating an embodiment of a process to detect virtual machine capacity related events. In the example shown, a combined Hotelling T2 chart 600 includes Hotelling T2 values for the 68-day training period shown in FIG. 4 and also corresponding Hotelling T2 values computed based on forecasted values for VM feature set metrics which have been forecasted using a statistical model as described above. In the example shown, a vertical line 602 shows the transition from the training set data (to the left of line 602) and the forecast data (to the right of line 602). Hotelling T2 values computed based on VM metric values forecasted for the forecast period 604, in the example shown for days 69 and beyond, are plotted to the right of line 602. As can be seen from FIG. 6, in the example shown, predicted Hotelling T2 values for forecast period days 69, 70, and 71, and for several of the subsequent days, are predicted to exceed the alert threshold, in this example the UCL of the corresponding training set data.

In some embodiments, the techniques described herein are performed on a massively parallel processing (MPP) database which is able to handle large amounts of data (i.e., "big data") which other systems may have trouble processing and/or managing. Models and scoring of individual VMs are processed in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of planning virtual machine capacity, comprising:
    constructing a set of time series data based at least in part on values of virtual machine related metrics observed with respect to a virtual machine during a training period to obtain training data;
    using the training data to construct a Hotelling T2 chart and compute Hotelling T2 values corresponding to the observed values of each of one or more of the virtual machine related metrics at a predetermined time during a plurality of successive time periods;
    using a subset of the virtual machine related metrics of said time series data and the Hotelling T2 chart to build a forecast model for said virtual machine to forecast future values of said one or more of the virtual machine related metrics during a forecast period;
    selecting control limits for the Hotelling T2 chart based at least in part on the computed Hotelling T2 values for the training data;
    setting an alert threshold based at least in part on the selected control limits and on a difference between said observed values of said subset of virtual machine related metrics and mean values of said subset of virtual machine related metrics for the virtual machine; and
    comparing the forecasted values to the alert threshold to predict when an alert condition might be expected to occur in the forecast period,
    wherein a responsive action is taken based at least in part in response to determining the alert condition is predicted to be met.

2. The method of claim 1, wherein the Hotelling T2 values correspond to a distance value associated with a difference between an observed feature vector and an associated mean vector.

3. The method of claim 2, wherein the distance value is associated with a multivariate normal distribution.

4. The method of claim 1, wherein the metric values are associated with at least one of health, usage, error, and configuration data.

5. The method of claim 1, wherein the responsive action includes increasing a capacity of the virtual machine.

6. The method of claim 1, further comprising receiving the virtual machine related metric values.

7. The method of claim 6, further comprising determining based at least in part on a statistical analysis of the received virtual machine related metric values a subset of the virtual machine related metric values to be included in a feature set for the virtual machine.

8. The method of claim 7, further comprising including in the time series data corresponding values for virtual machine metrics included in the feature set.

9. The method of claim 1, wherein building said forecast model for the virtual machine comprises building a vector auto-regression model for the virtual machine.

10. A virtual machine capacity planning system, comprising:
    a processor configured to:
        construct a set of time series data based at least in part on values of virtual machine related metrics observed with respect to a virtual machine during a training period to obtain training data;
        use the training data to construct a Hotelling T2 chart and compute Hotelling T2 values corresponding to the observed values of each of one or more of the virtual machine related metrics at a predetermined time during a plurality of successive time periods;
        use a subset of the virtual machine related metrics of said time series data and the Hotelling T2 chart to build a forecast model for said virtual machine to forecast future values of said one or more of the virtual machine related metrics during a forecast period;
        select control limits for the Hotelling T2 chart based at least in part on the computed Hotelling T2 values for the training data;
        setting an alert threshold based at least in part on the selected control limits and on a difference between said observed values of said subset of virtual machine related metrics and mean values of said subset of virtual machine related metrics for the virtual machine;
        compare the forecasted values to the alert threshold to predict when an alert condition might be expected to occur in the forecast period,
        wherein a responsive action is taken based at least in part in response to determining the alert condition is predicted to be met; and
    a memory or other storage device coupled to the processor and configured to store the set of time series data.

11. The system of claim 10, wherein the Hotelling T2 values correspond to a distance value associated with a difference between an observed feature vector and an associated mean vector.

12. The system of claim 10, wherein the responsive action includes increasing a capacity of the virtual machine.

13. The system of claim 10, further comprising a communication interface coupled to the processor and configured to receive the virtual machine related metric values.

14. The system of claim 13, wherein the processor is further configured to determine based at least in part on a statistical analysis of the received virtual machine related metric values a subset of the virtual machine related metric values to be included in a feature set for the virtual machine.

15. The system of claim 14, wherein the processor is further configured to include in the time series data corresponding values for virtual machine metrics included in the feature set.

16. The system of claim 10, wherein the processor is configured to use at least in part the constructed time series data to build a vector auto-regression model for the virtual machine.

17. A computer program product to perform virtual machine capacity planning, the computer program product being embodied in a non-transitory computer readable storage medium and comprising computer instructions for:
    constructing a set of time series data based at least in part on values of virtual machine related metrics observed with respect to a virtual machine during a training period to obtain training data;

using the training data to construct a Hotelling T2 chart and compute Hotelling T2 values corresponding to the observed values of each of one or more of the virtual machine related metrics at a predetermined time during a plurality of successive time periods;

using a subset of the virtual machine related metrics of said time series data and the Hotelling T2 chart to build a forecast model for said virtual machine to forecast future values of said one or more of the virtual machine related metrics during a forecast period;

selecting control limits for the Hotelling T2 chart based at least in part on the computed Hotelling T2 values for the training data;

setting an alert threshold based at least in part on the selected control limits and on a difference between said observed values of said subset of virtual machine related metrics and mean values of said subset of virtual machine related metrics for the virtual machine; and comparing the forecasted values to the alert threshold to predict when an alert condition might be expected to occur in the forecast period, wherein a responsive action is taken based at least in part in response to determining the alert condition is predicted to be met.

18. The computer program product of claim 17, wherein the Hotelling T2 values correspond to a distance value associated with a difference between an observed feature vector and an associated mean vector.

19. The computer program product of claim 18, wherein the distance value is associated with a multivariate normal distribution.

20. The computer program product of claim 17, wherein building said forecast model for the virtual machine comprises building a vector auto-regression model for the virtual machine.

* * * * *